United States Patent [19]

Liu

[11] Patent Number: 4,901,060
[45] Date of Patent: Feb. 13, 1990

[54] INCREASING TEMPERATURE WARNING DEVICE

[76] Inventor: Lester C. Liu, 2151 Old Oakland Rd., #89, San Jose, Calif. 95131

[21] Appl. No.: 255,879

[22] Filed: Oct. 11, 1988

[51] Int. Cl.$^4$ ............................................. G01K 7/00
[52] U.S. Cl. .................. 340/598; 307/310; 340/635
[58] Field of Search .............. 340/595, 598, 584, 635; 361/103, 104, 106; 307/310, 117

[56] References Cited

U.S. PATENT DOCUMENTS

| | | | |
|---|---|---|---|
| 3,277,460 | 10/1966 | Heckman | 340/635 |
| 3,469,250 | 9/1969 | Voigt | 340/598 |
| 4,087,848 | 5/1978 | Hyink | 307/310 |
| 4,331,888 | 5/1982 | Yamauchi | 340/598 |
| 4,438,348 | 3/1984 | Casper | 307/310 |

Primary Examiner—Michael J. Tokar
Attorney, Agent, or Firm—Thomas E. Schatzel

[57] ABSTRACT

An increasing temperature warning device for protecting an item from high temperature or fire damage comprising a thyristor connected in parallel with a reference voltage source. An audible or visual warning means is connected in series with the thyristor. When the temperature of the thyristor exceeds a specified temperature, the thyristor switches on and the warning means is activated. A series combination of a diode and a resistor can be connected in parallel with the gate of the thyristor to cause the reference voltage to be a function of the ambient temperature of the protected device. A diode connected in series with the thyristor allows the increasing temperature warning device to be powered by an alternating current source and a pair of thin wire fuses protect the warning device from excess current situations.

24 Claims, 2 Drawing Sheets

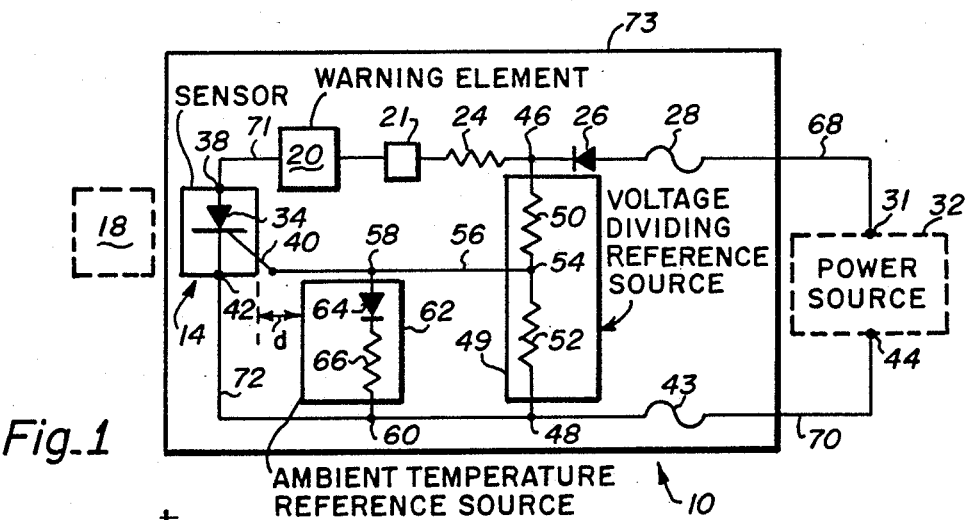

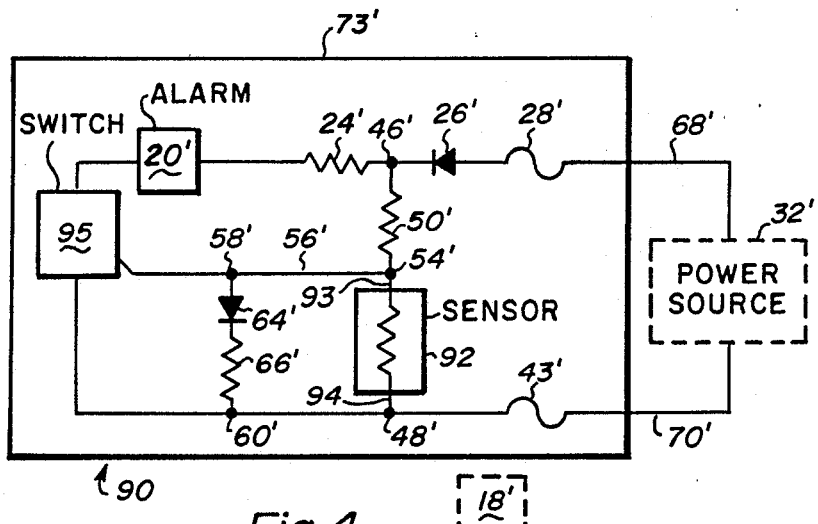
Fig_4
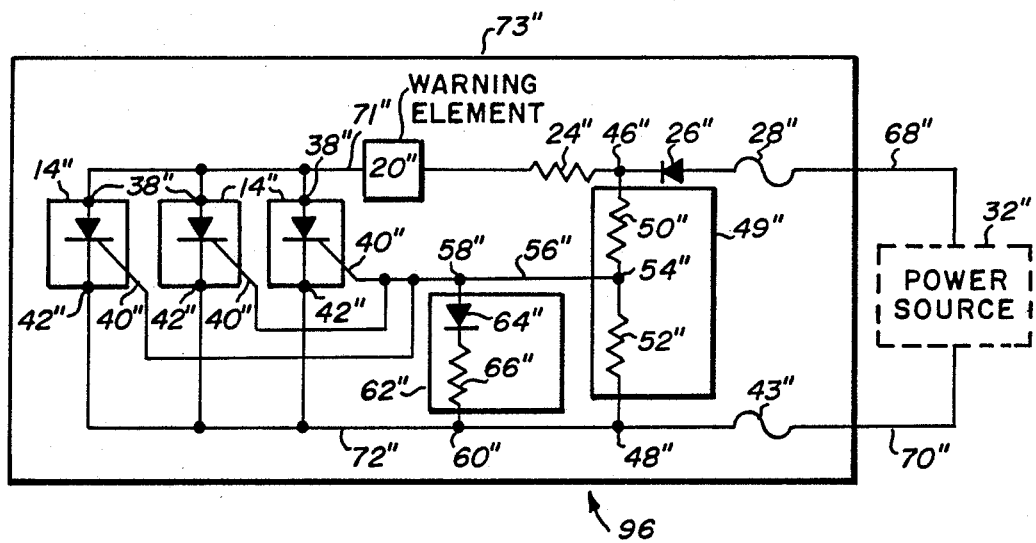
Fig_5

INCREASING TEMPERATURE WARNING DEVICE

BACKGROUND OF THE INVENTION

1. Field of the Invention

The invention relates generally to a temperature sensing device and more particularly to a device that provides a warning when a thyristor within the device detects an increase in temperature in an item to which the temperature sensing device is in close proximity.

2. Description of the Prior Art

There are many devices used in the electrical safety area, such as fuses, circuit breakers and circuit protectors, that function when an excessive current situation develops in a main electrical line. Similarly, there are many types of smoke detectors available that sound a warning once smoke has been generated. The present invention comprises a small, inexpensive semiconductor circuit that can be placed near an item such as an electrical switch, socket or plug. The invention gives a warning when a temperature increase near the item occurs thus allowing a fire or other dangerous condition to be avoided.

The substantial negative temperature-resistance coefficient of some semiconductor materials has been utilized in the prior art to create temperature dependent switching devices. For example, U.S. Pat. No. 3,343,004, issued to Ovishinsky on Sept. 19, 1967 for a "Heat Responsive Control System", discloses a current controlling device comprising a temperature sensitive semiconductor component connected in series with a load resistance. When a temperature increase occurs, the blocking resistance of the semiconductor component drops permitting current to flow in the circuit.

Similarly, systems have been reported for sounding an alarm in response to an increase in temperature. Representative examples of the prior art include U.S. Pat. No. 4,550,313, issued to Kimura on Oct. 29, 1985 for a "Fire Detecting System", which discloses a general circuit that utilizes a comparator to produce an alarm signal when the output of a sensor exceeds a reference voltage. U.S. Pat. No. 4,538,137, issued to Kimura on Aug. 27, 1985 for a "Fire Detector", discloses a circuit in which the output voltage of the sensor activates a Zener diode and a thyristor which in turn alters the frequency at which a capacitor is discharged. U.S. Pat. No. 4,315,256, issued to Dennis on Feb. 9, 1982 for a "Chimney Fire Detector", discloses a temperature sensing circuit in which the sensor comprises a pair of insulated twisted wires connected to a thyristor which is connected in series to an alarm. A temperature increase melts the insulation of the wires allowing the wires to touch and complete the circuit. U.S. Pat. No. 3,728,702, issued to Miyamoto, et al on Apr. 17, 1973 for a "Temperature Alarm Utilizing Paired Positive and Negative Coefficient Thermistors", discloses the use of series connected thermistors to generate a signal that operates a Schmitt circuit.

None of the prior art discloses a circuit that can be conveniently utilized to provide an early warning that a dangerous temperature condition is developing in an item.

SUMMARY OF THE PRESENT INVENTION

It is therefore an object of the present invention to provide a simple and inexpensive increasing temperature warning device that provides a warning before a fire occurs.

It is another object of the present invention to provide an increasing temperature warning device that can be used with a wide variety of items.

It is another object of the present invention to provide a device that can be easily calibrated to compensate for the normal operating temperature of the item to which it is attached.

Briefly, a preferred embodiment of the present invention includes a thyristor connected in series with a warning element, a first resistor, a first diode rectifier and a pair of thin wire fuse members. The thyristor functions as a thermal sensor and as a switch and is placed in close proximity to an item to be protected (e.g. an electric switch, socket outlet, plug or circuit breaker). A second and a third resistor are connected in parallel with the thyristor for providing a reference voltage. When the temperature of the thyristor exceeds a certain level versus ambient temperature, the threshold potential of the thyristor will drop below the reference voltage allowing current to flow through the warning element and the first resistor thus activating the warning element. Typically, the temperature increase that switches on the thyristor is higher than the normal operating temperature of the protected item, but is lower than the temperature that will cause a fire to occur. Thus, the warning is sounded before a fire occurs.

A second diode and a fourth resistor are connected in parallel with the third resistor in order to make the reference voltage a function of ambient temperature. A first thin wire fuse member is positioned between one terminal of a power supply and the thyristor and acts as a fuse to prevent damage caused by a short circuit inside the increasing temperature warning device. Similarly, a second thin wire is positioned between the other terminal of the power supply and the thyristor.

An advantage of the present invention is that the increasing temperature warning device is activated by rising temperature before a fire occurs.

Another advantage of the present invention is that the simplicity and size of the device allows it to be attached to a wide variety of items.

Another advantage of the present invention is that it is inexpensive to manufacture.

Another advantage of the present invention is that the device can be easily calibrated to compensate for the normal operating temperature of the item to which it is attached.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a circuit diagram of an increasing temperature warning device according to the present invention;

FIG. 2 is a graph of the voltage variation with temperature of several elements of the circuit shown in FIG. 1;

FIG. 3A is a side view showing the front of a standard 120 volt alternating current socket;

FIG. 3B is a side view of the back of the socket of FIG. 3A showing the increasing temperature warning device attached to the socket;

FIG. 4 is a circuit diagram of a first alternative embodiment of the present invention; and FIG. 5 is a circuit diagram of a second alternative embodiment of the present invention.

DETAILED DESCRIPTION OF THE PREFERRED EMBODIMENT

FIG. 1 is a circuit diagram of an increasing temperature warning device represented by the general reference numeral 10 and incorporating the present invention. The device 10 includes a sensor 14 which is located in close physical proximity to a protected item 18, e.g. an electric switch, socket, outlet, plug or circuit breaker, which is not part of the present invention. Typically, the sensor 14 is separated from the other elements of the device 10 by a distance "d". Under normal conditions, the item 18 is maintained at a normal or ambient temperature. A warning element 20, a coupling component 21, a resistor 24, a diode 26 and a fuse member 28 are connected in series between the sensor 14 and a terminal 31 of a power source 32. In the preferred embodiment, the sensor 14 comprises a thyristor (semiconductor controlled rectifier) 34 comprising an anode 38, a gate 40 and a cathode 42. The warning element 20 can be any type of warning component such as an audible component, e.g. horns, buzzers and sirens, or a visual component, e.g. light or flasher. Additionally, several different warning components could be connected in series so as to give several warning signals simultaneously. The power source 32, which is not part of the present invention, is generally a 110 volt alternating current source. A fuse member 43 is connected in series between the cathode 42 and an opposite terminal 44 of the power source 32. The fuse members 28 and 43 can each be a piece of thin wire that will burn out if excess current flows through the device 10. The coupling component 21 may be a relay coil or optical coupling component and is an optional element of the invention.

A node 46 is located between the first resistor 24 and the first diode 26. A node 48 is located between the cathode 42 and the second fuse member 43. A voltage dividing reference source 49 is connected in series between the nodes 46 and 48. In the preferred embodiment, the voltage dividing reference voltage source 49 comprises a resistor 50 and a resistor 52 connected in series between the nodes 46 and 48. A node 54 is located between the resistors 50 and 52. A lead 56 is connected between the node 54 and the gate 40. A node 58 is located on the lead 56 and a node 60 is located between the node 48 and the cathode 42. An ambient temperature reference source 62 is connected in series between the nodes 58 and 60. In the preferred embodiment, the ambient temperature reference source 62 comprises a diode 64 and a resistor 66 connected in series between the nodes 58 and 60. A pair of leads 68 and 70 connect the fuse members 28 and 43, respectively, to the power source 32. A lead 71 connects the sensor 14 to the warning element 20 and a lead 72 connects the sensor 14 to the node 60. A nonflammable enclosure 73 surrounds the circuit elements of the device 10.

FIG. 2 is a graphical representation of the voltage response of various circuit elements in the device 10 with changing temperature. A line 74 represents the threshold potential change of the thyristor 34 with changing temperature. A line 76 represents the forward voltage drop of the diode 64 at a set current level with increasing temperature and a line 78 is a transformation of the line 76 when the resistor 66 and the diode 64 are connected in series. The response of the resistors 50 and 52 is a horizontal line 80 and a curve 82 shows the diode forward voltage drop versus the current that passes the diode 64 at a set temperature. A point P exists at the intersection of the lines 74 and 80 and a fixed temperature $T_1$ is the temperature that corresponds to point P. The lines 74 and 76 are parallel (i.e. have the same slope) and therefore, a plurality of temperature differences $\Delta T_s$, measured at different voltage levels between the lines 74 and 76, are all equivalent in magnitude. In contrast, the lines 74 and 78 are not parallel and therefore a plurality of temperature differences $\Delta T_x$, measured at different voltage levels between the lines 74 and 78, are not equivalent in magnitude.

FIG. 3A shows a standard power source receptacle 84 such as a 110 volt or 220 volt socket. A pair of power source connectors 86 (only one shown) are located on the sides of the power source receptacle 84 and provide a means for accessing the power source of the receptacle 84. FIG. 3B shows a typical use of the increasing temperature warning device 10. In FIG. 3B, the device 10 is attached to the back side of the receptacle 84 pictured in FIG. 3A. Thus, the receptacle 84 corresponds to the item 18 shown in FIG. 1. The leads 68 and 70 are each connected to one of the power source connectors 86 thereby providing a source of power for the device 10. The largest component of the device 10 is the warning element 20 which is shown as a cylindrically shaped buzzer 87 in FIG. 3B having a diameter D and a height h. Typically, the diameter D is approximately one inch and the height h is approximately two tenths of an inch (0.2 inch). A protruding area 88 protrudes from the buzzer 87 and is positioned near one of the connectors 86. The other components of the device 10 can easily be positioned inside the housing of the buzzer 87. The housing of the buzzer 87 functions as the nonflammable enclosure 73.

FIG. 4 is an alternative embodiment of the present invention showing a high temperature warning device designated by the general reference numeral 90. Elements of the device 90 that are identical to elements of the device 10 are designated by the same numeral distinguished by a prime symbol.

In the device 90 a thermal resistor 92 replaces the resistor 52 of device 10. In this configuration the thermal resistor 92 becomes the thermal sensor and the resistor 92 would be positioned near the protected item 18'. A lead 93 connects the resistor 92 to the node 54' and a lead 94 connects resistor 92 to the node 48'. A switch 95 replaces the sensor 14 of device 10. The switch 95 can be the thyristor 34 or it could be a different circuit element such as a transistor or a pair of transistors.

FIG. 5 is another alternative embodiment of the present invention showing a multiple sensor increasing temperature warning device designated by the general reference numeral 96. Elements of the device 96 that are identical to elements of the device 10 are designated by the same numeral distinguished by a double prime symbol.

In FIG. 5 a plurality of the sensors 14" are connected in parallel instead of the single sensor 14 shown in FIG. 1. When the sensors 14" comprise a thyristor, a plurality of gates 40" are connected to the lead 56".

Referring to FIG. 1, the operation of the device 10 is believed to be as follows. The diode 26 converts alternating current from the power source 32 to a half wave type voltage to power the device 10. The resistors 50 and 52 function as the voltage dividing reference source 49. (Note, the resistors 50 and 52 could be replaced by any suitable voltage dividing reference means such as a resistor connected in series with a semiconductor component, e.g. a diode). The device 10 is positioned in close proximity to the protected item 18 at a location where temperature monitoring is desired. The distance d is chosen so that while the sensor 14 responds to the temperature of the item 18, the ambient reference temperature source 62 remains at ambient temperature. If it is so desired, the lengths of the leads 71 and 72 and the gate 40 lead, can be increased such that the sensor is positioned outside of the enclosure 73, at a specific point where temperature monitoring is desired. Under normal thermal conditions, current does not flow through the sensor 14 because the threshold voltage across the nodes 48 and 54 is lower than the threshold potential of the thyristor 34. However, as the temperatures of the protected item 18 and sensor 14 rise, the threshold potential of the thyristor 34 will decrease. When it decreases below the reference voltage across the resistor 52, current will flow through sensor 14 which activates the warning element 20. The resistor 24 limits the current when the warning element 20 is activated. In selecting component values of the device 10, values are selected such that the temperature increase sufficient to activate the warning element 20 is lower than the temperature that will cause a fire to occur in the protected item 18 or structure associated with it. Thus, the warning element 20 is activated before a fire occurs.

Use of the ambient temperature reference source 62, comprising the diode 64 and the resistor 66, makes the reference voltage across the resistors 50 and 52 a function of the ambient temperature of the protected item 18. In other words, use of the ambient temperature reference source 62 causes the device 10 to give a warning at a temperature interval above the ambient temperature of the item 18. By varying the value of resistor 52, the value for the temperature $T_1$, shown in FIG. 2, can be varied. This provides a means for setting an ambient temperature that will be tolerated by the device 10. The lower the resistance value for the resistor 52, the higher the ambient temperature that will be tolerated by the device 10 without activating the warning element 20. It should be noted that the ambient temperature reference source 62 can be deleted from the device 10 with the consequence that the warning element 20 will be activated at a fixed temperature set by resistor 52.

FIG. 2 further illustrates the manner in which various circuit elements in the device 10 function. The horizontal line 80 represents the constant reference voltage fixed by the resistors 50 and 52. The reference voltage is not affected by temperature changes and as long as the reference voltage across resistor 52 is less than the threshold potential of the thyristor 34, the warning element 20 will not be activated. In contrast, the line 74 illustrates that the threshold potential of the thyristor 34 varies with temperature. For standard semiconductor devices this change is approximately 2.5 millivolts/°C. As represented by the line 76, the diode 64 has approximately the same response to variations in temperature as the thyristor 34, and hence the lines 74 and 76 are parallel. The result of lines 74 and 76 being parallel is that the warning element 20 will be activated when the temperature increases from the ambient or normal operating temperature of the protected item 18 by the constant amount $\Delta T_s$.

The line 78 illustrates the situation when the ambient temperature reference source 62 comprising the diode 64 and the resistor 66, is used as shown in FIG. 1. The lines 74 and 78 are not parallel and hence the warning element 20 will be activated when the nonconstant temperature increase $\Delta T_x$ occurs. The slope of the line 78 can be varied by changing the resistance value of the resistor 66. Hence, by adjusting the value of the resistor 66, the warning element 20 can be set to be activated at various temperature increments above the ambient temperature fixed by the resistor 52. Thus, three situations can be described for the device 10. First, if the ambient temperature reference source 62 is not used, the device 10 will give a warning signal whenever the fixed temperature $T_1$ is exceeded. Second, if the ambient temperature reference source 62 include the diode 64, but not resistor 66, the device 10 will give a warning signal at the constant temperature interval, $\Delta T_s$, above the ambient temperature of the item 18. Third, when the ambient temperature reference source 62 includes both the diode 64 and the resistor 66, the device 10 will give a warning signal at the variable temperature interval, $\Delta T_x$, above the ambient temperature of item 18.

In FIG. 1, the nonflamable enclosure 73 surrounds all the circuit elements of the device 10 except for parts of the two leads 68 and 70 which protrude from the enclosure 73 for easy attachment to the power source 32. The distance d is chosen so that the sensor 14 will register a temperature increase at a selected position within the item 18 while the other circuit elements of the device, and particularly the ambient temperature reference source 62, remain at the ambient temperature of the device 10. If the enclosure 73 comprises a poor heat conducting material such as plastic, the distance d can be as small as a few millimeters. The device 10 is then positioned with the sensor 14 near the item 18 or near a point inside the item 18 where temperature monitoring is desired. If a temperature increase occurs at the item 18, the temperature increase is registered by the sensor 14. The temperature increase is not registered at the ambient temperature reference source 62 because of the distance d separating the sensor 14 from the reference source 62 and because the enclosure 73 is a poor heat conductor. Alternatively, the sensor 14 can be positioned outside of the enclosure 73, for positioning near the protected item 18, by increasing the lengths of the leads 71 and 72 and the gate 40 lead. The warning element 20 can also be positioned outside the enclosure 73 to facilitate observation of the warning element 20.

In some applications, it may be desirable to use the device 10 to automatically shut down the protected device 18 when a dangerous condition is sensed. This can be accomplished by utilizing the coupling component 21 to activate a switch (not shown) which shuts down the protected item 18. When a current condition exists in the device 10 such that the alarm 20 is activated, the coupling component 21 is also activated.

In FIGS. 3A and 3B, the receptacle 84 is a standard 110 volt or 220 volt alternating current socket. When an abnormal amount of heat develops in the receptacle 84 the warning device 10 is activated and a warning signal is given before a fire starts. The sensor 14 is positioned inside of the protruding area 88 to increase the distance d separating the ambient temperature reference source 62 and the sensor 14 (see FIG. 1). The protruding area 88 is positioned near the power source connector 86 which is the location within the receptacle 84 at which temperature monitoring is desired. An abnormal heat condition in the connector 86 could develop from any number of situations such as a bad connection, an overdrawn current situation, or a short circuit in the receptacle 84. Other installations of the device 10 include placement near an a.c. plug, a circuit breaker, an axle of a wheeled machine such as a train or car, or near other items where an abnormal temperature condition could develop.

The device 90 shown in FIG. 4 is useful when temperatures above the maximum temperature limitation of semiconductor components are encountered. In this configuration, the thermal resistor 92 would be positioned outside the enclosure 73' near the item 18' by increasing the lengths of the leads 93 and 94. Thus, only the resistor 92 would be exposed to the abnormal temperature area and the semiconductor components of the switch 95 would not be destroyed. As the temperature increases, the resistance of the thermal resistor 92 increases. When the voltage drop across the resistor 92 exceeds the threshold potential of the voltage controlled switch 95, current passes through the switch 95 and activates the alarm 20'.

The device 96 shown in FIG. 5 can be used to monitor several protected devices simultaneously by positioning one of the sensors 14" near each device to be monitored. For example, the device 96 could be used with multi-pole breakers. The sensors 14" can be positioned outside of the enclosure 73" by increasing the lengths of the leads 71" and 72" and the gate 40".

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An increasing temperature warning device sized for positioning inside of an electrical apparatus and for providing a warning when the temperature of said electrical apparatus exceeds a predetermined magnitude, the device comprising:
    a pair of electrical leads connected to a power source within said electrical apparatus and for providing electrical power to the increasing temperature warning device;
    a first means for sensing temperature changes connected to the pair of electrical leads and placed in thermal communication with a component of said electrical apparatus at which temperature sensing is desired when current flows through said component;
    a warning means positioned in said electrical apparatus and connected to the first means for sensing temperature changes and for providing a warning indication when temperature changes of a predetermined magnitude in said component are sensed by said first means for sensing temperature changes, said predetermined magnitude being a level less than that which causes fire ignition within said apparatus; and
    a voltage dividing reference means connected to the first means for sensing temperature change and providing a reference voltage relative to said predetermined magnitude.

2. The increasing temperature warning device of claim 1 wherein,
    the warning means comprises an audible signal emitting device.

3. The increasing temperature warning device of claim 1 wherein,
    the warning means comprises a visual signal emitting device.

4. The increasing temperature warning device of claim 1 wherein,
    the voltage dividing reference means comprises at least two resistors.

5. The increasing temperature warning device of claim 1 wherein,
    the voltage dividing reference means comprises a resistor connected in series with a semiconductor component.

6. The increasing temperature warning device of claim 5 wherein,
    the semiconductor component comprises a diode.

7. The increasing temperature warning device of claim 1 wherein,
    the first means for sensing temperature changes comprises a thyristor.

8. The increasing temperature warning device of claim 1 further comprising,
    an ambient temperature reference means connected to the voltage dividing reference means for making said reference voltage a function of ambient temperature.

9. The increasing temperature warning device of claim 8 wherein,
    the ambient temperature reference means comprises a diode.

10. The increasing temperature warning device of claim 9 further comprising,
    at least one resistor connected in series with the diode.

11. The increasing temperature warning device of claim 1 further comprising,
    a means for providing half wave voltage pulses to the means for sensing temperature change.

12. The increasing temperature warning device of claim 11 wherein,
    the means for providing half wave voltage pulses comprises a diode rectifier.

13. The increasing temperature warning device of claim 1 further comprising,
    a means for protecting said warning device from excessive current flow.

14. The increasing temperature warning device of claim 13 wherein,
    the means for protecting said warning device from excessive current flow comprises at least one thin wire connected in series with the means for giving warning.

15. The increasing temperature warning device of claim 1 further comprising,
    a second means for sensing temperature changes connected in parallel with the first means for sensing temperature changes.

16. The increasing temperature warning device of claim 15 wherein,
    the second means for sensing temperature changes comprises a thyristor.

17. The increasing temperature warning device of claim 1 further comprising,
    a means for coupling the warning means to a switch.

18. The increasing temperature warning device of claim 17 wherein,
the means for coupling comprises an optical coupling component connected in series with the means for giving warning.

19. The increasing temperature warning device of claim 17 wherein,
the means for coupling comprises a relay coil connected in series with means for giving warning.

20. An increasing temperature warning device comprising:
a thermal resistor for sensing temperature changes placed in close proximity to a component of an electrical apparatus at which temperature sensing is desired during operation of said apparatus;
a current switching means connected in parallel with the thermal resistor;
a warning means for giving warning connected in series with the current switching means; and
at least one resistor connected in series with the thermal resistor;
whereby current flows through the switching means when the temperature of the thermistor exceeds a fixed value.

21. The increasing temperature warning device of claim 20 wherein,
the current switching means comprises a thyristor.

22. The increasing temperature warning device of claim 20 wherein,
the current switching means comprises at least one resistor.

23. The increasing temperature warning device of claim 20 wherein,
the warning means comprises a visible signal emitting device.

24. An increasing temperature warning device sized for positioning inside of an electrical apparatus and for providing a warning when the temperature of said electrical apparatus exceeds a predetermined magnitude, the device comprising:
a pair of electrical leads for connection to a power source within said electrical apparatus and for providing electrical power to the increasing temperature warning device;
a thyristor having an anode, cathode and gate element, said anode and cathode elements extending to the pair of electrical leads, the thyristor being placed in thermal communication with a component of said electrical apparatus to be monitored for an increase in temperature;
a warning element connected to one of said elements of the thyristor for sensing the magnitude of current through the thyristor and providing a warning indication when said monitored temperature increases to a predetermined magnitude and is sensed by the thyristor, said predetermined magnitude being at a level less than that which causes fire ignition within said apparatus;
a voltage dividing reference source connected between the warning element and one of said elements of the thyristor, the source comprising at least two resistors connected in series with the junction of said two resistors connected to said gate element of the thyristor for providing a reference voltage relative to said predetermined magnitude; and
an ambient temperature reference source means for sensing the ambient temperature and connected between said gate element and said cathode elements of the thyristor, whereby the ambient temperature reference source makes said reference voltage a function of ambient temperature.

* * * * *